United States Patent [19]
Sugimoto et al.

[11] Patent Number: 5,824,920
[45] Date of Patent: Oct. 20, 1998

[54] APPARATUS FOR EVALUATING MAGNETIC RECORDING MEDIUM

[75] Inventors: Masaharu Sugimoto; Minoru Takahashi; Hiroaki Wakamatsu; Hirosi Satou, all of Kawasaki, Japan

[73] Assignee: Fujitsu Limited, Kawasaki, Japan

[21] Appl. No.: 696,367

[22] Filed: Aug. 13, 1996

[30] Foreign Application Priority Data

Oct. 27, 1995 [JP] Japan ................................ 7-280552

[51] Int. Cl.⁶ ...................................................... G11B 5/60
[52] U.S. Cl. ............................................................ 73/865.8
[58] Field of Search ....................... 73/865.8; 360/97.01, 360/103

[56] References Cited

U.S. PATENT DOCUMENTS 5,673,156  9/1997  Chen et al. .

FOREIGN PATENT DOCUMENTS

| 0227220 | 10/1986 | Japan | ..................................... 360/103 |
| 352177  | 3/1991  | Japan . | |
| 3201282 | 9/1991  | Japan . | |
| 489618  | 3/1992  | Japan . | |
| 6309636 | 11/1994 | Japan . | |
| 721752  | 1/1995  | Japan . | |

*Primary Examiner*—Robert Raevis
*Attorney, Agent, or Firm*—Greer, Burns & Crain, Ltd.

[57] ABSTRACT

A method of obtaining a limit glide height in flying a head above a recording medium being rotated. The first step is storing the medium and the head into a chamber, stepwise reducing an air pressure in the chamber, and measuring a flying height of the head and a frequency of contact of the head with the medium in each step. The second step is performing head vanish to polish away projections on the medium by means of the head under such conditions that the head at least intermittently comes into contact with the medium. The third step is reproducing the air pressure in each step in the first step, and again measuring a flying height of the head and a frequency of contact of the head with the medium in each step. The final step is comparing a measured value of the frequency of contact in each step in the first step and a measured value of the frequency of contact in each step in the third step, and obtaining the limit glide height defined as a flying height of the head corresponding to the step in which a rate of change in the frequency of contact becomes largest.

7 Claims, 8 Drawing Sheets

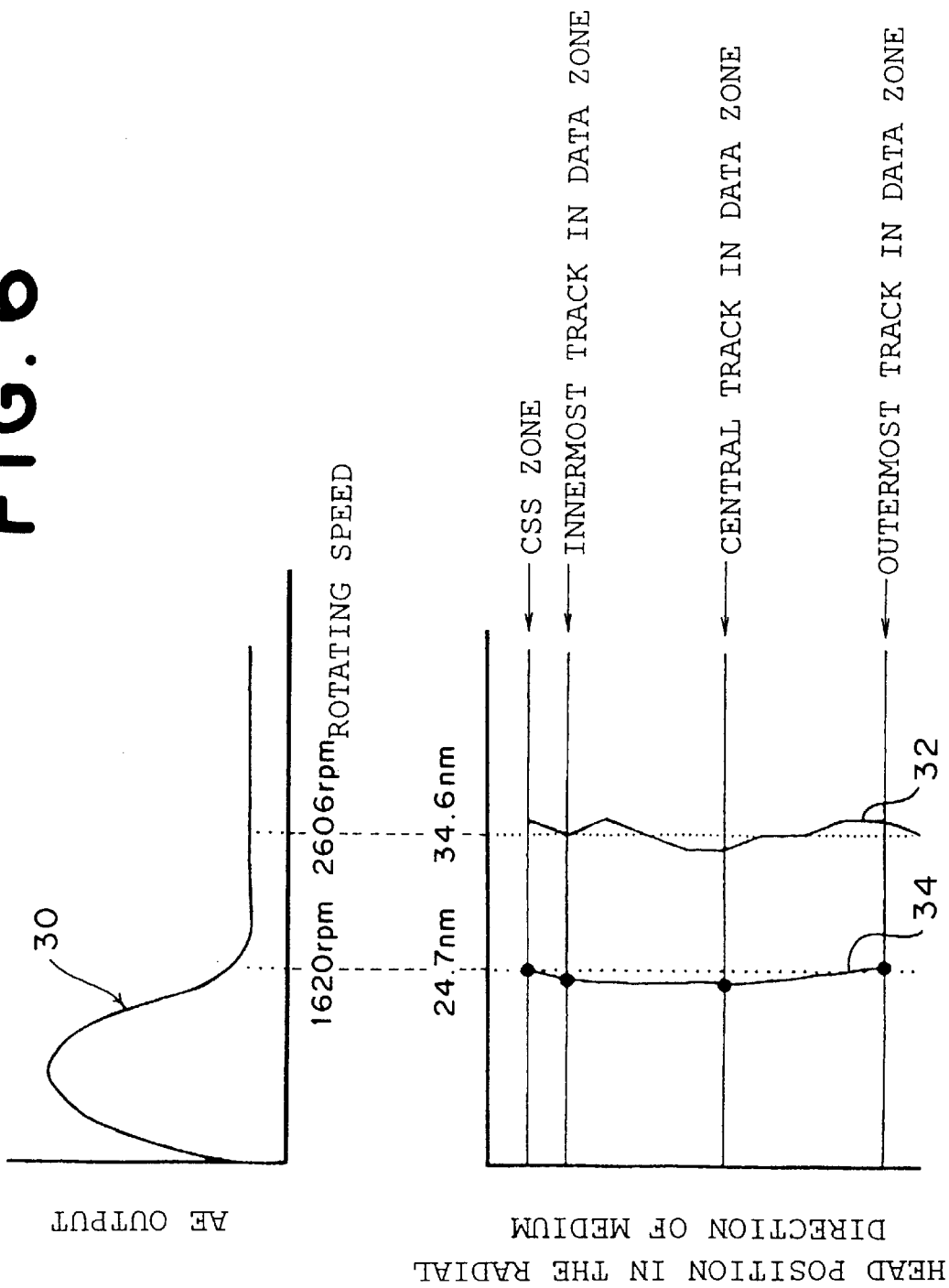

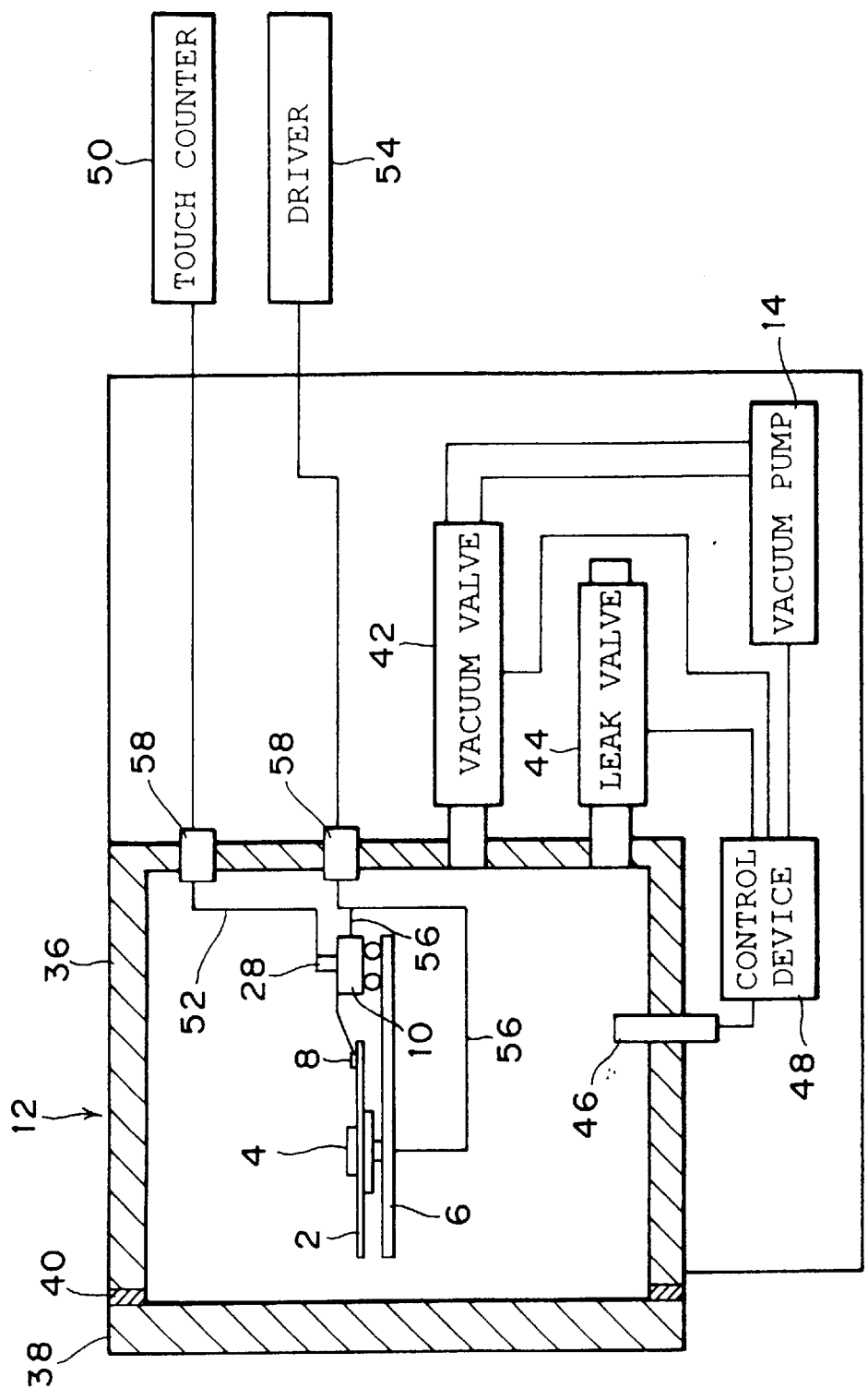

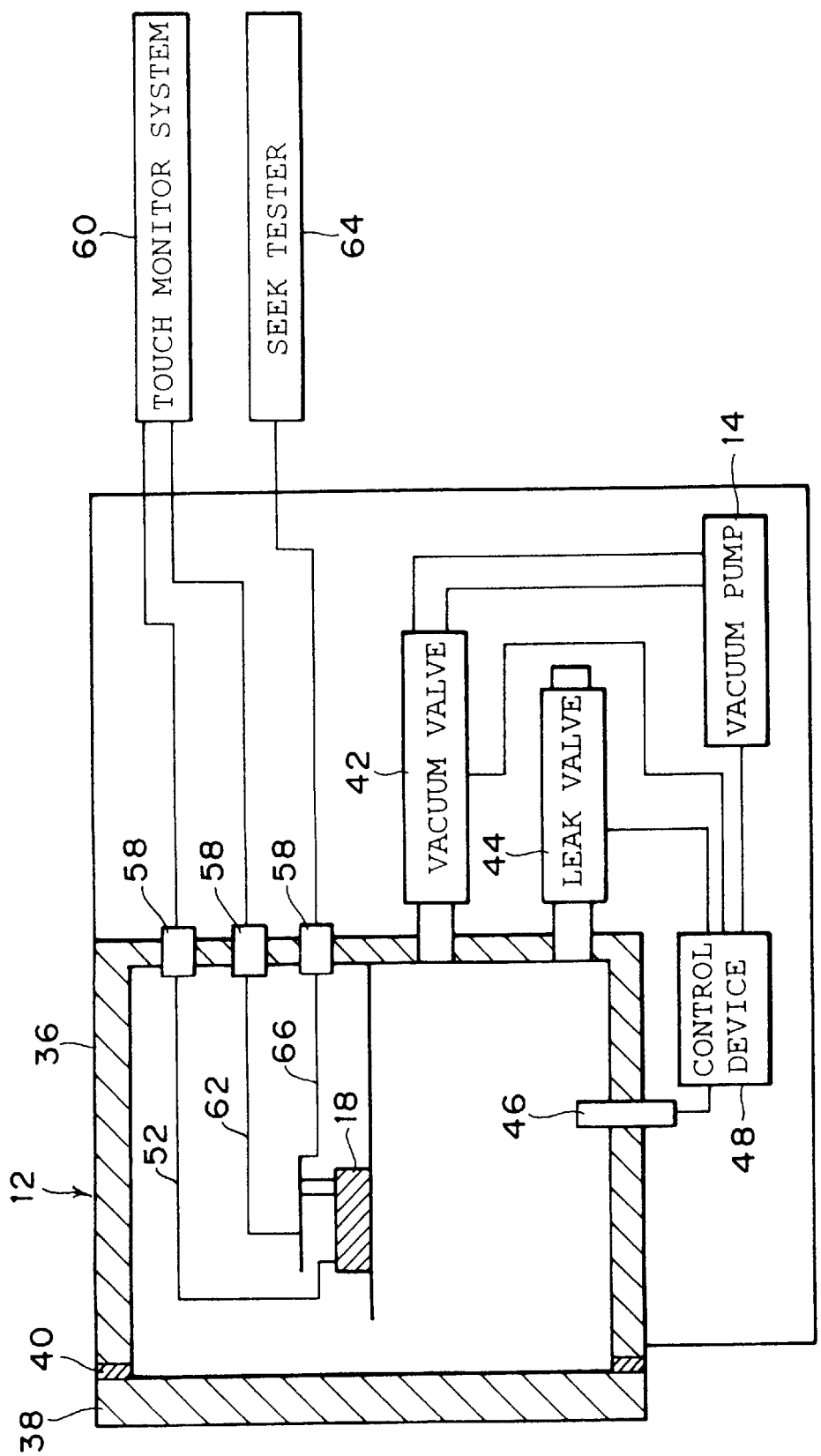

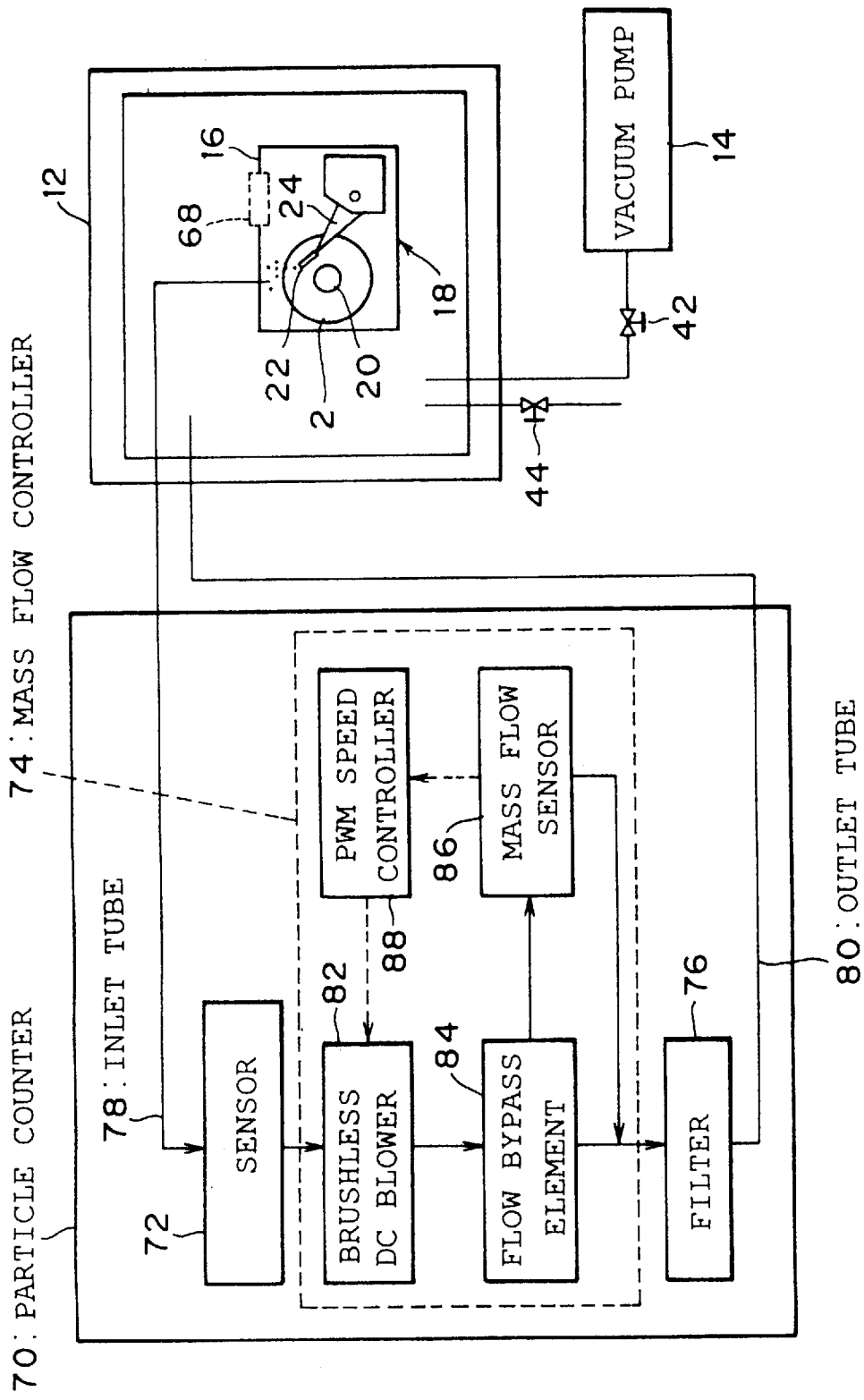

APPARATUS FOR EVALUATING MAGNETIC RECORDING MEDIUM

BACKGROUND OF THE INVENTION

1. Field of the Invention

The present invention relates generally to head vanish and evaluation of a recording medium, and more particularly to a method of obtaining a limit glide height in flying a head above a recording (e.g., magnetic recording) medium being rotated, a method of performing the head vanish to polish away projections on the medium by means of the head, an accelerated evaluation method for durability of the medium and the head, and an apparatus for measuring the count of dust particles in a disk enclosure stored in a chamber that can be evacuated.

2. Description of the Related Art

In recent years, a small-sized apparatus having a large capacity recording medium has been demanded in response to an increase in quantity of data to be handled by a computer system. To increase a recording density per unit area, decreased spacing between a head and a medium has been required. In this situation, it is desired to provide an evaluation apparatus or method for avoidance of contact between the head and the medium in the condition where the spacing between the head and the medium is small, for optimization of the spacing between the head and the medium, and for development for a durable head/medium.

As a technique for avoiding the contact between the head and the medium in a disk drive having a magnetic disk as the medium, a method of polishing away projections on the medium by head vanish is disclosed in Japanese Patent Laid-open No. Hei 6-052543, for example. In this method and any other similar conventional methods, a dedicated head specially designed for the head vanish is used, and the medium subjected to the head vanish is mounted in the disk drive to thereby manufacture the disk drive.

Regarding the evaluation of durability of the head/medium, a special head/medium dedicated for the evaluation of durability is prepared, and an accelerated test is carried out by using the special head/medium to shorten an evaluation period, because evaluation by running of an actual machine requires a long period.

Further, various methods of evaluating the durability of the head/medium by reducing a head flying height due to evacuation are disclosed in Japanese Patent Laid-open Nos. Hei 2-80975 and Hei 3-52177. However, in any of the methods, setting of air pressure conditions for the evaluation is not clear.

As a method for identifying a polished condition of a head/medium, dust in a disk drive is measured in general. However, in the case that the disk drive is stored in an evacuated chamber, a suction force generated by a particle counter for dust measurement is overcome by a vacuum generated by a vacuum pump connected to the evacuated chamber, so that suction for dust measurement cannot be obtained. In performing running evaluation under vacuum, dust measurement must be carried out after running and then returning the reduced air pressure to an atmospheric pressure.

SUMMARY OF THE INVENTION

It is therefore an object of the present invention to perform improved head vanish on, and evaluation of, a medium.

More specifically, it is a first object of the present invention to provide a method of obtaining a limit glide height applicable to the head vanish and the evaluation of the medium.

It is a second object of the present invention to provide an improved method of performing the head vanish to polish away projections on the medium by means of a head.

It is a third object of the present invention to provide an improved method of performing accelerated evaluation of durability of the medium and the head.

It is a fourth object of the present invention to provide an apparatus for measuring the count of dust particles in a disk enclosure stored in a chamber that can be evacuated.

In accordance with a first aspect of the present invention, there is provided a method of obtaining a limit glide height in flying a head above a recording medium being rotated, comprising the steps of (a) storing the medium and the head into a chamber, stepwise reducing an air pressure in the chamber, and measuring a flying height of the head and a frequency of contact of the head with the medium in each step; (b) performing head vanish to polish away projections on the medium by means of the head under such conditions that the head at least intermittently comes into contact with the medium; (c) reproducing the air pressure in each step in the step (a) and again measuring a flying height of the head and a frequency of contact of the head with the medium in each step; and (d) comparing a measured value of the frequency of contact in each step in the step (a) and a measured value of the frequency of contact in each step in the step (c), and obtaining the limit glide height defined as a flying height of the head corresponding to the step in which a rate of change in the frequency of contact becomes largest.

Preferably, measurement of the frequency of contact of the head with the medium is performed by detection of an elastic wave generating from the head.

In accordance with a second aspect of the present invention, there is provided a method of obtaining a limit glide height in flying a head above a recording medium being rotated, comprising the steps of (a) obtaining an avalanche curve representing a relation between magnitude of an elastic wave generating from the head and of the medium in increasing the rotating speed; and (b) obtaining the limit glide height defined as a flying height of the head determined by a value of the rotation speed that indicates the start of a flat region in the avalanche curve.

In accordance with a third aspect of the present invention, there is provided a method of performing head vanish to polish away projections on a recording medium by means of a head, comprising the steps of (a) rotating the medium in a chamber that can be evacuated, and flying the head above the medium; (b) reducing an air pressure in the chamber until a given flying height of the head is obtained, and making the head come into contact with the medium being rotated.

Preferably, the given flying height in the step (b) is the limit glide height obtained by the method according to the first aspect or by the method according to the second aspect.

In accordance with a fourth aspect of the present invention, there is provided an accelerated evaluation method for durability of a recording medium and a head in flying the head above the medium being rotated, comprising the steps of (a) obtaining a limit glide height; (b) storing the medium and the head into a chamber that can be evacuated, and controlling an air pressure in the chamber to make a flying height of the head substantially equal to the limit glide height; and (c) rotating the medium at the limit glide height and measuring a time until at least one of the medium and the head.

In accordance with a fifth aspect of the present invention, there is provided an apparatus for measuring the count of dust particles in a disk enclosure stored in a chamber that can be evacuated, comprising an inlet tube for taking air inside the disk enclosure out of the chamber; a mass flow controller for sucking the air from the disk enclosure so as to make an air flow in the inlet tube per unit time constant; an outlet tube for returning the air from the mass flow controller to the chamber; and a sensor provided in an air flowing path including the inlet tube, the mass flow controller, and the outlet tube, for measuring the count of dust particles in the air passing through the air flowing path per unit time.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 6 is a graph illustrating another method of obtaining a limit glide height;

FIG. 7 is a view showing a preferred embodiment of the apparatus shown in FIG. 1;

FIG. 8 is a view showing a preferred embodiment of the apparatus shown in FIG. 2; and FIG. 9 is a view showing a preferred embodiment of a particle count measuring apparatus.

DETAILED DESCRIPTION OF THE PREFERRED EMBODIMENTS

Some preferred embodiments of the present invention will now be described with reference to the drawings.

Figure 1:
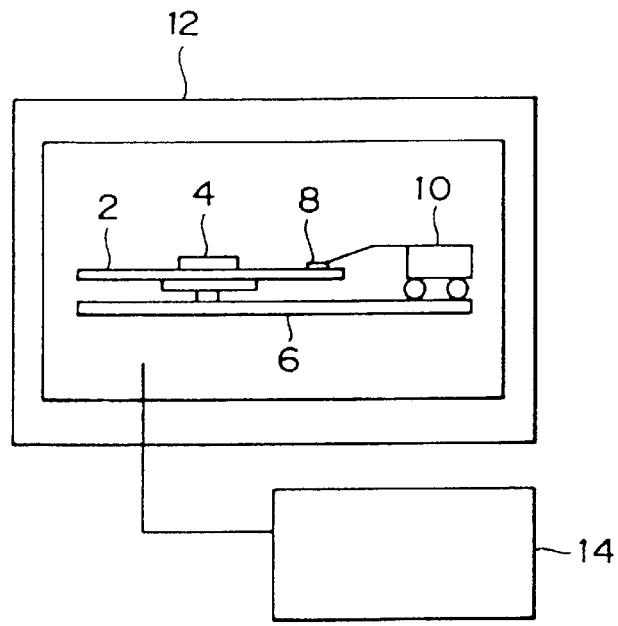
FIG. 1 is a view showing a basic configuration of an apparatus applicable to the method of the present invention.

FIG. 1 shows a basic configuration of an apparatus applicable to the method of the present invention. This apparatus is suitably applied to independent processing of a medium (recording medium such as a magnetic disk) not yet placed in a disk drive.

A medium 2 is rotationally driven by a spindle motor 4. The spindle motor 4 is provided on a base 6. Reference numeral 8 denotes a head supported by a carriage (or actuator) 10 so as to be movable in the radial direction of the medium 2 (i.e., allowed to perform a seek operation). When the medium 2 is at rest, the head 8 is kept in contact with the surface of the medium 2, whereas when the medium 2 is in rotation, the head 8 is kept flying above the medium 2. A flying height of the head 8 during rotation of the medium 2 is determined by a peripheral speed of the rotating medium 2, an air pressure surrounding the rotating medium 2, etc. All of the medium 2, the spindle motor 4, the base 6, the head 8, and the carriage 10 are accommodated in a chamber 12 that can be evacuated. The air pressure in the chamber 12 can be reduced by a vacuum pump 14.

Figure 2:
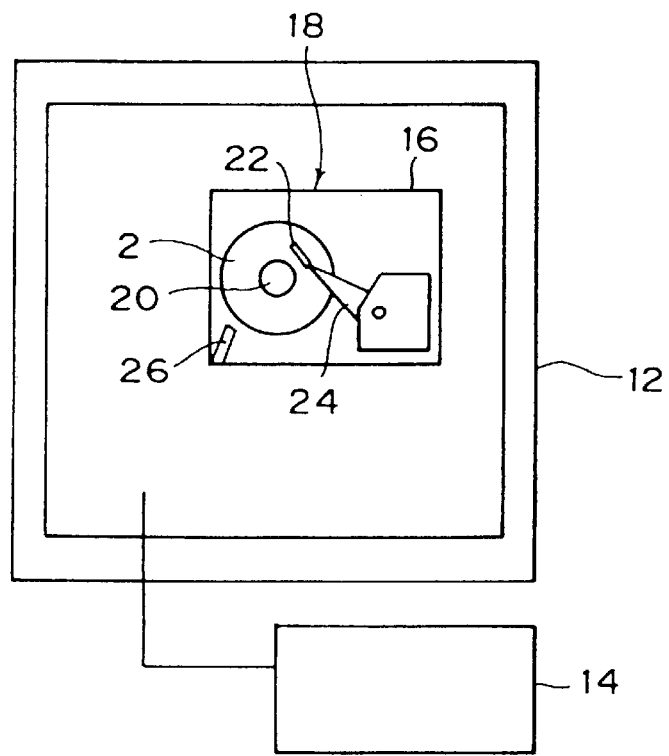
FIG. 2 is a view showing a basic configuration of another apparatus applicable to the method of the present invention.

FIG. 2 shows a basic configuration of another apparatus applicable to the method of the present invention. This apparatus is suitably applied in processing a medium placed in a disk drive. Throughout the drawings, substantially the same parts are denoted by the same reference numerals.

A medium 2 is mounted in a disk drive 18 having a disk enclosure 16 that can be tightly closed. A disk drive 18 has the medium 2, a spindle motor 20, a head 22, an actuator 24, and a circulation filter 26 all provided in the disk enclosure 16. The spindle motor 20 functions to rotationally drive the medium 2, and the head 22 corresponds to the head 8 shown in FIG. 1. The head 22 is more limited than the head 8 only because the head 22 is used for magnetic recording/reproduction. The actuator 24 functions to support the head 22 so as to allow it to move in the radial direction of the medium 2. The circulation filter 26 functions to trap dust present in the disk enclosure 16.

The disk drive 18 is accommodated in a chamber 12 that can be evacuated by a vacuum pump 14. An air pressure in the disk enclosure 16 is kept equal to that in the chamber 12 by the operation of a breather filter (not shown) provided in the disk enclosure 16.

Although a single medium and a single head are shown in each of FIGS. 1 and 2, a plurality of media and heads may be used.

There will now be described a method of obtaining a limit glide height characteristic of the present invention by using the apparatus shown in FIG. 1 or 2.

Figure 3:
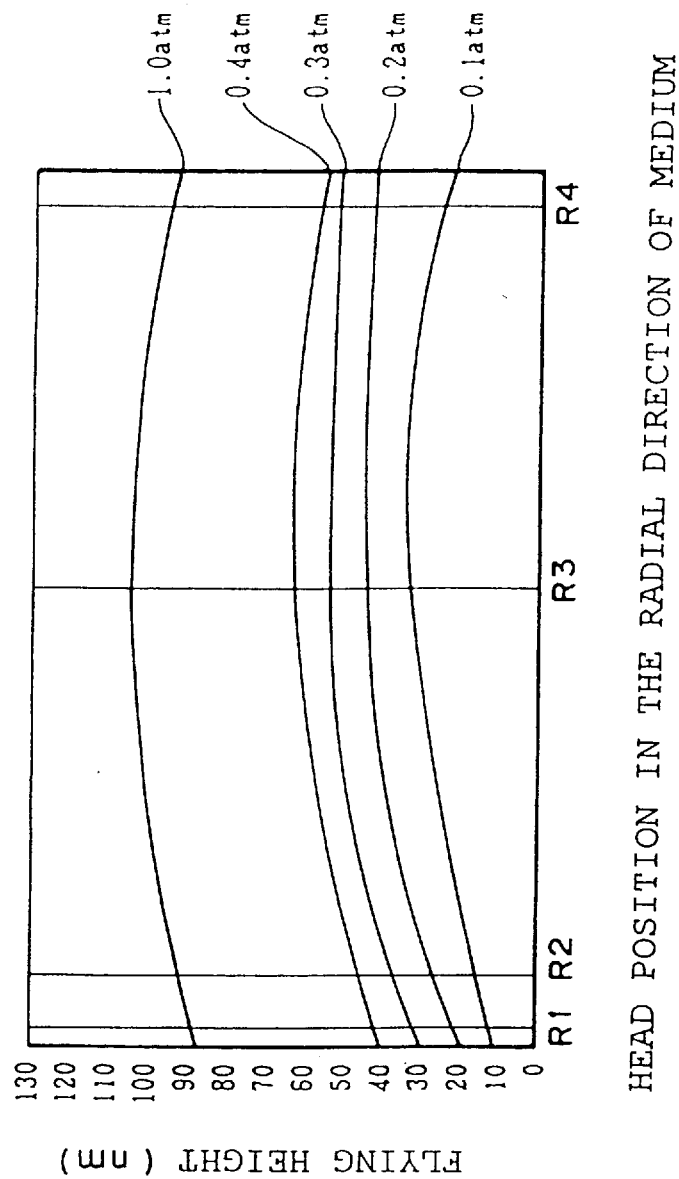
FIG. 3 is a graph showing the air pressure dependence of a flying height of a head.

FIG. 3 is a graph showing the air pressure dependence of flying height of the head above the medium. In FIG. 3, the vertical axis represents flying height (nm) of the head, and the horizontal axis represents position of the head in the radial direction of the medium. In the horizontal axis, R1, R2, R3, and R4 represent radial positions of the head in a CSS (contact-start-stop) zone, on an innermost track in a data zone, on a central track in the data zone, and on an outermost track in the data zone, respectively. The CSS zone is set radially inside of the data zone on the medium, and the head is normally positioned in the CSS zone in the rest condition of the medium.

As apparent from FIG. 3, the flying height of the head decreases with a decrease in air pressure irrespective of positions of the head in the radial direction of the medium. Accordingly, the flying height can be identified from a given air pressure by specifying a position of the head in the radial direction of the medium.

Figure 4:
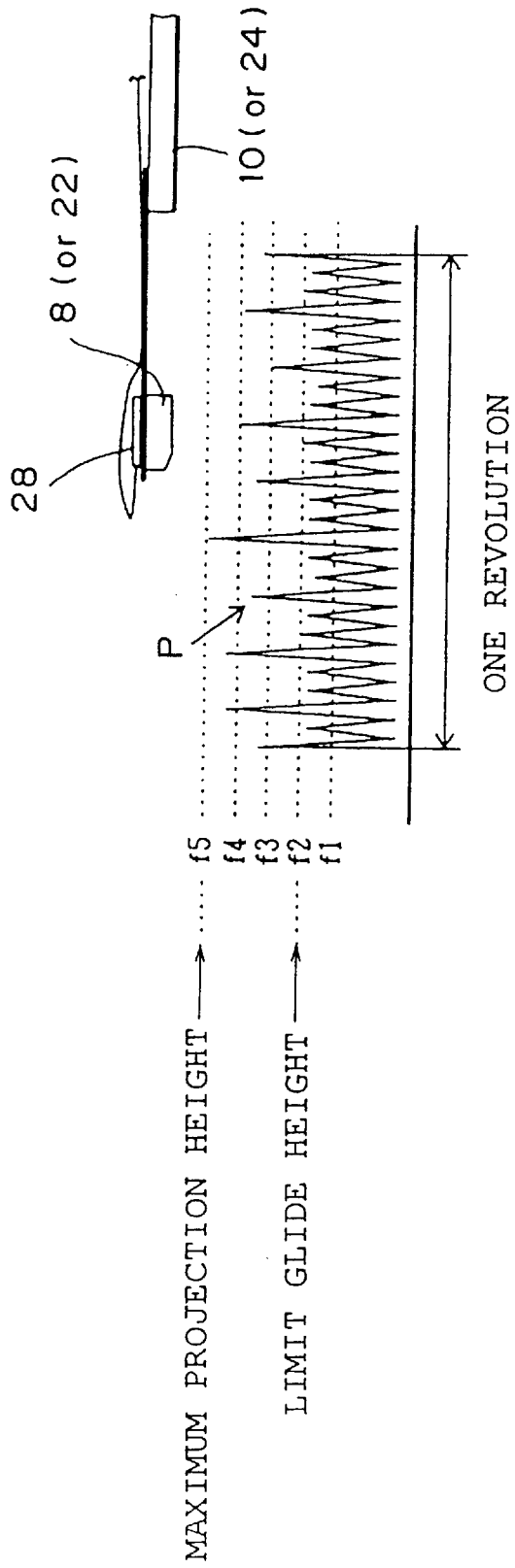
FIG. 4 is a view illustrating a method of measuring the frequency of contact of a head with a medium.

There will now be described a method of measuring the frequency of contact of the head with the medium with reference to FIG. 4. According to this measuring method, the frequency of contact of the head with the medium is measured by detecting elastic waves generating from the head. More specifically, as shown in FIG. 4, elastic wave detecting means 28 such as an AE (Acoustic Emission) sensor is provided in the vicinity of the head 8 (or 22), and measurement of the contact frequency is made according to output signals from the elastic wave detecting means 28. The elastic wave detecting means 28 may be provided on the carriage 10 (or the actuator 24). The contact frequency corresponds to a count value of output pulses from the elastic wave detecting means 28. Therefore, by using a usual digital circuit including a limitter and a counter, the contact frequency can be measured. Alternatively, output signals from the elastic wave detecting means 28 may be input into an RMS (Root-Mean-Square) meter to measure the contact frequency from a root-mean-square value of the output signals.

In FIG. 4, reference symbol P denotes projections on the surface of the medium, and reference symbols f1 to f5 represent the heights of the projections. The height f5 is a maximum projection height, and the height f2 is a limit glide height to be hereinafter described, in this preferred embodiment.

Figure 5A:
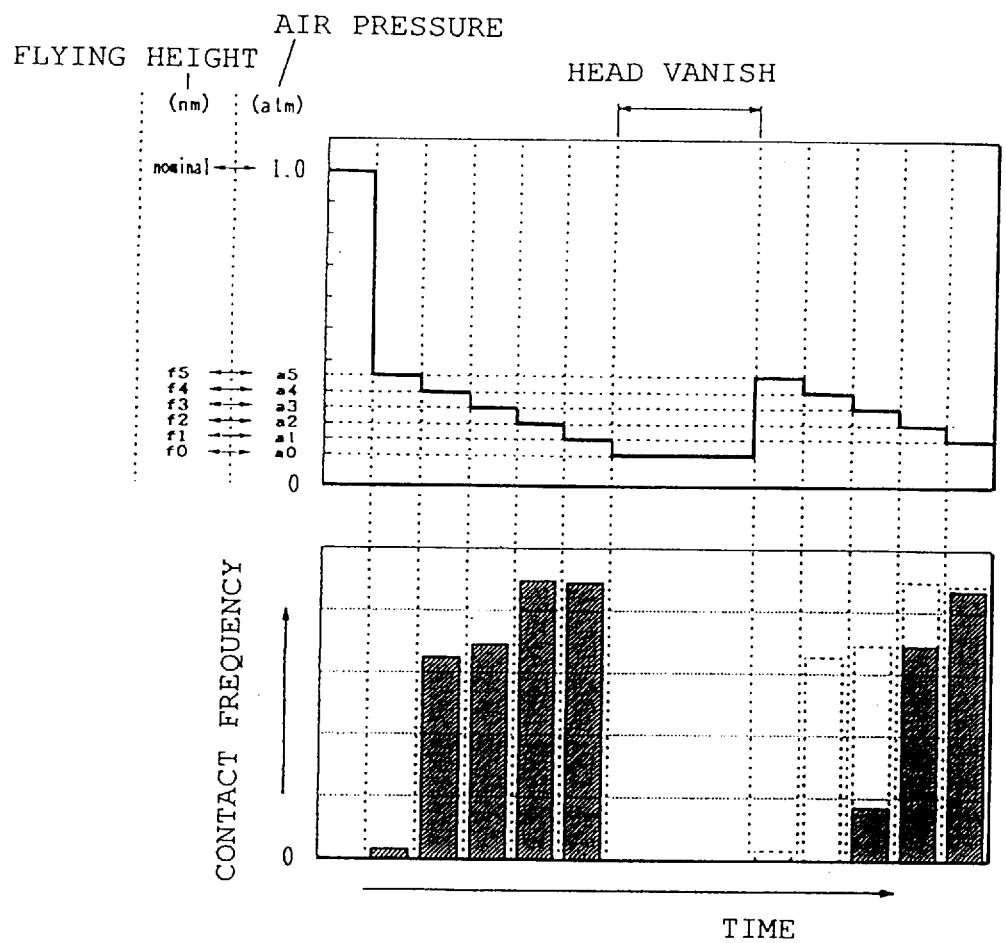
FIGS. 5A and 5B are graphs illustrating a method of obtaining a limit glide height.
Figure 5B:
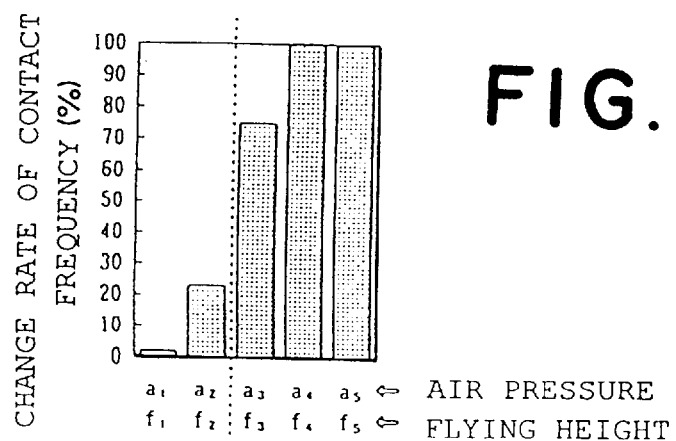

FIGS. 5A and 5B are graphs illustrating a method of obtaining a limit glide height. In the upper part of FIG. 5A, the vertical axis represents flying height and air pressure, and the horizontal axis represents elapsed time. In the lower part of FIG. 5A, the vertical axis represents contact frequency, and the horizontal axis represents elapsed time. In FIG. 5B, the vertical axis represents change rate (%) of contact frequency, and the horizontal axis represents air pressure and flying height.

A method of obtaining a limit glide height by using the apparatus shown in FIG. 1 or 2 will now be described step by step.

(1) The head is loaded on the CSS zone of the medium under atmospheric pressure (1.0 atm).

(2) The medium is rotated to fly the head.

(3) The air pressure in the chamber 12 is gradually reduced to reduce the flying height of the head as reciprocatively moving the head between the outermost track and the innermost track of the data zone.

(4) The start of contact of the head with the medium is detected by the elastic wave detecting means 28, and an air pressure a5 at this time is recorded.

(5) The air pressure in the chamber 12 is stepwise reduced from the air pressure a5 at which the head starts contact with the medium while the head is being reciprocatively moved above the medium, and the frequency of contact of the head with the medium is recorded with the changed air pressures. For example, the air pressure is stepwise reduced from a5 through a4, a3, a2 to a1 in this order.

(6) Under the condition that the head at least intermittently comes into contact with the medium, e.g., under an air pressure a0 lower than the air pressure a1, the head is reciprocatively moved between the outermost track and the innermost track of the data zone to thereby perform head vanish to the medium.

(7) The air pressure in the chamber 12 is restored to a5.

(8) The air pressure in the chamber 12 is again stepwise reduced from the air pressure a5 while the head is being reciprocatively moved above the medium, and the contact frequency and the changed air pressures are recorded again.

(9) A change rate of the contact frequency at each air pressure is obtained from the data recorded in the steps (5) and (8), and a value of the flying height corresponding to the air pressure (a2 in this case) providing a largest difference in the change rate between this air pressure and the adjacent air pressure is set as the limit glide height.

In FIGS. 5A and 5B, flying heights f0, f1, f2, f3, f4, and f5 respectively corresponding to the air pressures a0, a1, a2, a3, a4, and a5 can be easily known from the graph shown in FIG. 3. In this preferred embodiment shown in FIGS. 5A and 5B, the limit glide height is set to f2.

The limit glide height obtained in this manner is very useful for determining whether or not head crash occurs. The head crash herein means that at least one of the medium and the head becomes damaged.

This will be described more specifically with reference to FIGS. 5A and 5B. The condition that the flying height is greater than f5 corresponds to a first mode where the head completely flies above the medium and does not come into contact with the medium at all. The condition that the flying height is in the range from f2 to f5 corresponds to a second mode where the head intermittently comes into contact with the medium, but damage to the head or the medium does not occur. The condition that the flying height is smaller than the limit glide height f2 corresponds to a third mode where the head intermittently comes into contact with the medium, and damage to the head or the medium occurs, or in other words, a head crash occurs.

Accordingly, by setting the flying height of the head to the limit glide height and performing the head vanish, the projections on the medium can be well polished away. Alternatively, by setting the flying height of the head to the limit glide height and performing accelerated evaluation of durability of the medium and the head, the durability of a disk drive as an actual machine can be evaluated.

FIG. 6 illustrates another method of obtaining a limit glide height according to the present invention. First, an avalanche curve 30 representing the relation between magnitude of elastic waves generating from the head and rotating speed of the medium is obtained by increasing the rotating speed of the medium. In the upper part of FIG. 6, the vertical axis represents AE output (mVrms) corresponding to magnitude of elastic waves generating from the head, and the horizontal axis represents rotating speed (rpm) of the medium. As increasing the rotating speed of the medium, the AE output first increases to a maximum value. After reaching the maximum value, the AE output gradually decreases to a fixed value in a region not less than a given rotating speed (e.g., 1620 rpm in this case). This region will be referred to as a flat region of the avalanche curve 30. In the lower part of FIG. 6, the vertical axis represents position of the head in the radial direction of the medium, and the horizontal axis represents flying height of the head calculated corresponding to rotating speed of the medium. Reference numeral 32 denotes a distribution of maximum projection heights in the radial direction of the medium, and reference numeral 34 denotes a distribution of limit glide heights in the radial direction of the medium.

As apparent from the correspondence between the upper part and the lower part of FIG. 6, the limit glide height is determined by the specific rotating speed giving the start of the flat region of the avalanche curve 30. The limit glide height obtained by this method corresponds to the boundary between the second mode and the third mode as similar to the limit glide height obtained by the method described with reference to FIGS. 5A and 5B.

There will now be described a method of performing head vanish by using the apparatus shown in FIG. 1. First, the medium 2 and the head 8 are accommodated in the chamber 12 as shown in FIG. 1, and the spindle motor 4 is rotated to fly the head 8. In this condition, the air pressure in the chamber 12 is reduced by the vacuum pump 14 to thereby set the flying height of the head 8 to a given flying height providing the contact of the head 8 with the medium 2, thereby making the head 8 polish away the projections on the medium 2. In performing this head vanish, the head 8 is reciprocatively moved in the radial direction of the medium 2 by the carriage 10, thereby uniformly polishing away the projections on the data zone of the medium. The range of movement of the head 8 in the radial direction of the medium 2 is set between the innermost track and the outermost track in the data zone, for example.

While the head 8 is a head dedicated for head vanish in this method, a head to be used in an actual disk drive may be adopted.

The conditions of head vanish can be variously set by changing the air pressure in the chamber 12 to thereby change the flying height of the head 8. Accordingly, the head vanish to the medium 2 can be performed simply under optimum conditions. The above-mentioned given flying height of the head 8 is set to the limit glide height obtained according to the present invention, thereby properly performing the head vanish without inviting head crash.

There will now be described a method of performing head vanish by using the apparatus shown in FIG. 2. In this method, the head vanish is performed by using the magnetic head 22 for read/write of data, accommodated in the disk enclosure 16. First, the disk drive 18 is accommodated in the chamber 12, and the air pressure in the chamber 12 is reduced by the vacuum pump 14 to thereby set the flying height of the head 22 in the disk drive 18 to a given flying height providing the contact of the head 22 with the medium 2. In this condition, the head 22 is reciprocatively moved in the radial direction of the medium 2 by the actuator 24 to thereby perform head vanish to the medium 2. Particles of the medium 2 generated by polishing away the projections on the medium 2 are trapped by the circulation filter 26.

In this method, the head vanish is performed in an evacuated condition after assembling the disk drive. Accordingly, the magnetic disk drive can be easily manufactured.

In the case that the head 22 and the medium 2 are both plural, all the media can be simultaneously subjected to one cycle of head vanish operation, thereby shortening the time required for head vanish operation as a whole.

Further, like the method using the apparatus shown in FIG. 1, the above-mentioned given flying height of the head 22 is set to the limit glide height obtained according to the present invention, thereby properly performing the head vanish without inviting head crash.

There will now be described a method of performing accelerated evaluation of durability of the medium and the head by using the apparatus shown in FIG. 1 or 2. This method is performed in the following order, for example.

(1) A limit glide height is obtained according to the present invention.

(2) The air pressure in the chamber 12 is reduced by the vacuum pump 14 to make the flying height of the head 8 or 22 substantially equal to the limit glide height obtained in the step (1).

(3) The medium 2 starts to be rotated at the limit glide height, and time is measured until the medium or the head becomes damaged.

In the conventional method, the correlation between the result of accelerated evaluation as measured time until the damage occurs and the result of running evaluation in an actual disk drive cannot be obtained, because a decrease in head flying height by evacuation cannot be properly set. In contrast, according to the method of this preferred embodiment, the air pressure in the chamber is controlled so as to obtain the limit glide height, so that a head flying height optimum for accelerated evaluation can be obtained to allow the accelerated evaluation to correlate with the running evaluation in the actual disk drive.

In this accelerated evaluation method, the test may be made by moving the head in the radial direction of the medium, or may be made with the head fixed at a predetermined position in the radial direction of the medium.

The time until the damage occurs may be measured from a change in frequency of contact of the head with the medium, a change in read/write characteristics to the medium, or a change in count of dust particles in the disk enclosure.

FIG. 7 shows a preferred embodiment of the apparatus shown in FIG. 1. A chamber 12 is composed of a chamber body 36 in which a subject to be evaluated is accommodated, a door 38 for openably closing the chamber body 36, and a packing 40 interposed between the chamber body 36 and the door 38 to create a hermetic seal. The chamber 12 is connected through a vacuum valve 42 to a vacuum pump 14, thereby evacuating the chamber 12. Further, the chamber 12 is provided with a leak valve 44 to perform an operation such that the reduced air pressure in the chamber 12 is to be returned to an atmospheric pressure.

The air pressure in the chamber 12 is detected by a pressure sensor 46, and a detection signal from the pressure sensor 46 is supplied to a control device 48. The control device 48 controls the operations of the vacuum pump 14, the vacuum valve 42, and the leak valve 44 according to the signal from the pressure sensor 46 and a preliminarily stored program. Reference numeral 50 denotes a touch counter for measuring the count of touches or the frequency of contact of a head 8 with a medium 2. The touch counter 50 inputs an output signal from elastic wave detecting means 28 through a touch signal line 52. A driver 54 is provided to control the rotation of a spindle motor 4 and the operation of a carriage 10 in the radial direction of the medium 2 through a control signal lines 56. The touch signal line 52 and the control signal lines 56 are led out of the chamber 12 through hermetic terminals 58, thereby maintaining a hermetic condition in the chamber 12. The control device 48 is programmed so as to execute the method of the present invention mentioned above, and the description thereof will therefore be omitted to avoid repetition.

FIG. 8 shows a preferred embodiment of the apparatus shown in FIG. 2. In contrast to the preferred embodiment shown in FIG. 7, the preferred embodiment shown in FIG. 8 is characterized in that some modifications are made to accommodate a preassembled disk drive 18 in a chamber 12.

A touch signal indicating the count of touches or the frequency of contact of a head with a medium in the disk drive 18 is supplied through a touch signal line 52 to a touch monitor system 60. Further, information on positions of the head both in the circumferential direction and in the radial direction of the medium is supplied through a DE (Disk Enclosure) control signal line 62 to the touch monitor system 60. The touch monitor system 60 computes according to signals supplied from the signal lines 52 and 62 to create a touch map for determining the position of contact of the head with the medium. A seek tester 64 is provided to control the disk drive 18 through an interface cable 66. The signal lines 52 and 62 and the interface cable 66 are led out of the chamber 12 through hermetic terminals 58, thereby maintaining a hermetic condition in the chamber 12.

In performing head vanish in the preassembled disk drive 18, the control device 48 controls the vacuum pump 14, the vacuum valve 42, and the leak valve 44 according to information obtained from the pressure sensor 46 to maintain the air pressure in the chamber 12 at a required value, and the seek tester 64 operates the disk drive 18 under the control by the control device 48. At this time, the touch monitor system 60 detects the touch signal to perform the head vanish.

Also in performing the method of obtaining the limit glide height, the air pressure in the chamber 12 is controlled to thereby perform head vanish and touch detection.

In performing the accelerated evaluation method for durability of the medium and the head, running of the disk drive 18 is performed on the basis of a pressure condition such that the head flying height becomes equal to the limit glide height. In this case, the touch monitor system 60 may be made inoperative.

FIG. 9 shows a preferred embodiment of a particle count measuring apparatus useful in performing the method of the present invention. A chamber 12 is connected through a vacuum valve 42 to a vacuum pump 14. The chamber 12 is provided with a leak valve 44. A disk drive 18 accommodated in the chamber 12 has a disk enclosure 16 enclosing a medium 2, a head 22, etc. The disk enclosure 16 is provided with a breather filter 68 for making air pressures inside and outside the disk enclosure 16 equal to each other. A particle counter 70 for measuring the count of dust particles in the disk enclosure 16 includes a light scattering type or condensed nucleus type sensor 72 for measuring the count of dust particles per unit time in the air passing therethrough, a mass flow controller 74 for sucking the air from the disk enclosure 16 so as to make an air flow per unit time constant, and a filter 76 for trapping dust particles in the air passing therethrough.

The air containing the dust particles in the disk enclosure 16 is taken through an inlet tube 78 into the sensor 72. An air output from the sensor 72 is supplied to the mass flow controller 74, and an air output from the mass flow controller 74 is supplied to the filter 76. An air output from the filter 76 is returned through an outlet tube 80 into the chamber 12. The mass flow controller 74 is composed of a brushless DC blower 82 for sucking the air in the disk enclosure 16 through the inlet tube 78 and the sensor 72, a flow bypass element 84 for branching an air output from the blower 82 into two air outputs, a mass flow sensor 86 for measuring an air flow of one of the two air outputs from the flow bypass element 84 per unit time, and a PWM speed controller 88 for controlling the blower 82 so as to make an output level of the mass flow sensor 86 constant. The other of the two air outputs from the flow bypass element 84 is supplied to the filter 76. The air output from the outlet tube 80 may be supplied into the disk enclosure 16.

With this arrangement, even when pressure gradient temporarily occurs in the air flow path because of a change in air pressure in the chamber 12, a suction air flow can be immediately made constant, thereby allowing good measurement of the count of dust particles even under reduced pressure. Further, a closed system is constructed by using the inlet tube 78 and the outlet tube 80, so that the capacity of the brushless DC blower 82 can be reduced.

It is to be noted that the present invention is applicable not only to a magnetic disk, but also to any other recording media such as an optical disk and a magneto-optical disk.

As described above, according to the present invention, good head vanish and evaluation to a recording medium can be performed. That is, according to the first or second aspect of the present invention, it is possible to obtain a limit glide height in flying a head above a recording medium being rotated. According to the third aspect of the present invention, it impossible to provide a method of performing head vanish such that projections on the medium are to be well polished away by the head. According to the fourth aspect of the present invention, it is possible to provide a method of performing good accelerated evaluation of durability of the medium and the head. According to the fifth aspect of the present invention, it is possible to provide an apparatus for measuring the count of dust particles, suitably used in performing the method of the present invention.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method of obtaining a limit glide height for flying a head above a rotating recording medium, comprising the steps of:

(a) obtaining an avalanche curve representing a relation between magnitude of an elastic wave being generated from said head and rotation speed of said medium, said avalanche curve being obtained by increasing said rotation speed; and (b) obtaining said limit glide height defined as a flying height of said head determined by a value of said rotation speed that indicates the start of a flat region in said avalanche curve.

2. A method according to claim 1, further comprising the steps of rotating said medium in a chamber that can be evacuated, flying said head above said medium, reducing air pressure in said chamber until said limit glide height is obtained, and making said head come into contact with said rotating medium, thereby performing head vanish to polish away projections on said medium.

3. A method according to claim 2, wherein said head is a magnetic head stored in a disk enclosure and used for reading and/or writing data, said rotating medium also being stored in said disk enclosure.

4. A method according to claim 1, further comprising the steps of storing said rotating medium and said head in a chamber that can be evacuated, controlling air pressure in said chamber to make a flying height of said head substantially equal to said limit glide height, and measuring a time until at least one of said rotating medium and said head becomes damaged, thereby performing an accelerated evaluation for durability of said rotating medium and said head.

5. A method according to claim 4, wherein said damage to at least one of said rotating medium and said head is identified by a change in frequency of contact of said head with said rotating medium.

6. A method according to claim 4, wherein said damage to at least one of said rotating medium and said head is identified by a change in read/write characteristics to said rotating medium.

7. A method according to claim 4, wherein said damage to at least one of said rotating medium and said head is identified by a change in a count of dust particles in a disk enclosure enclosing said medium and said head.

* * * * *